Sept. 13, 1955 G. J. WILDT 2,717,453
PROPELLER GAUGE
Filed July 7, 1952 3 Sheets-Sheet 1
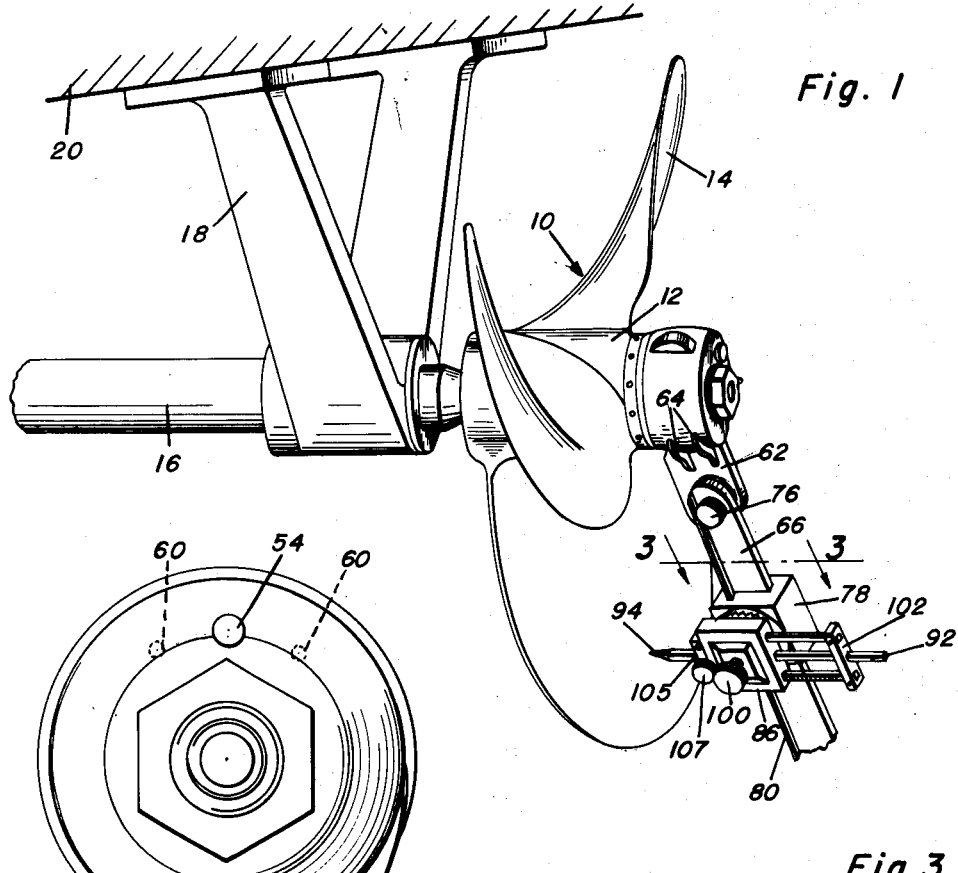
Fig. 1
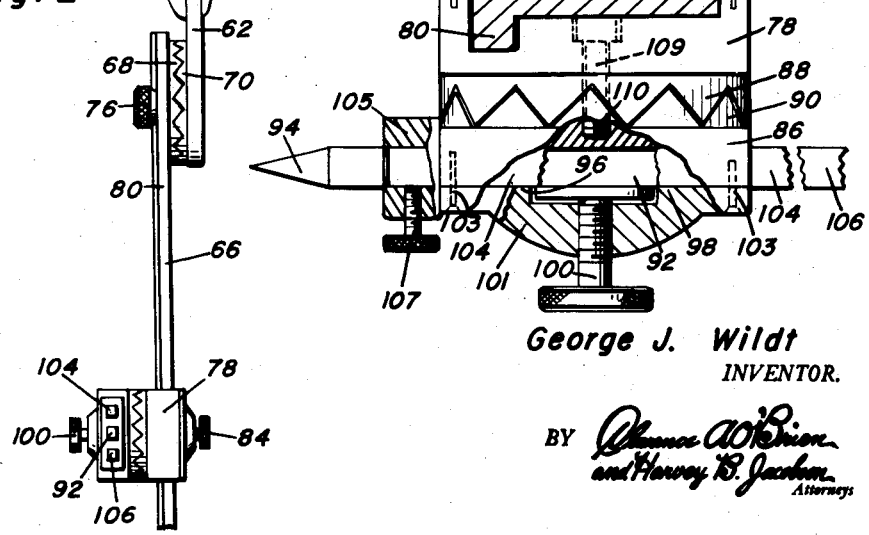
Fig. 2
Fig. 3
George J. Wildt
INVENTOR.

Sept. 13, 1955 G. J. WILDT 2,717,453
PROPELLER GAUGE
Filed July 7, 1952 3 Sheets-Sheet 2

George J. Wildt
INVENTOR.

BY *Clarence A. O'Brien*
*and Harvey B. Jackson*
Attorneys

Sept. 13, 1955      G. J. WILDT      2,717,453
PROPELLER GAUGE

Filed July 7, 1952      3 Sheets-Sheet 3

George J. Wildt
INVENTOR.

United States Patent Office 2,717,453
Patented Sept. 13, 1955

2,717,453

PROPELLER GAUGE

George J. Wildt, Miami, Fla.

Application July 7, 1952, Serial No. 297,425

9 Claims. (Cl. 33—174)

This invention comprises novel and useful improvements in a propeller gauge and more specifically pertains to a gauge adapted to be attached to a propeller shaft for testing and gauging a marine propeller without removing the same from the propeller shaft.

The principal object of this invention is to provide a gauge for marine propellers which shall be capable of gauging and testing such propeller blades for accuracy of pitch and shape without the necessity for moving the propeller from the propeller shaft.

An important object of this invention is to provide a propeller gauge in conformity with the preceding object, which shall be applicable to various types of propeller shafts, regardless of the pitch of thread thereof.

A further object of the invention is to provide a gauge having improved means for supporting a scriber upon a propeller shaft in circumferentially adjusted positions thereabout.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a fragmentary perspective view showing a portion of a marine propeller upon its propeller shaft and having the gauging device in accordance with this invention applied thereto;

Figure 2 is a fragmentary end elevational view of the device of Figure 1 taken from the right end thereof;

Figure 3 is a horizontal sectional detail view taken upon a large scale substantially upon the plane indicated by the section line 3—3 of Figure 1, parts being broken away and shown in section;

Figure 4:
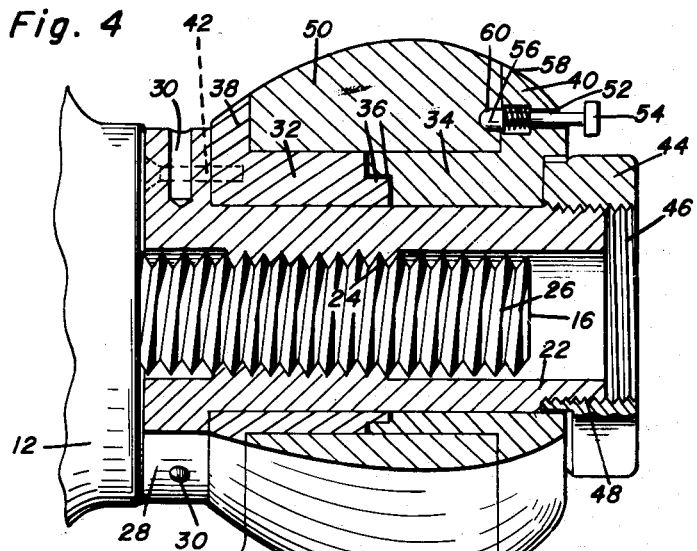
Figure 4 is a fragmentary view partly in vertical section and partly in elevation showing the internal construction of the means for journaling the gauge upon the propeller shaft.

Referring now more specifically to the accompanying drawings, wherein like numerals designate similar parts throughout the various views, attention is directed first to Figure 4, wherein a marine propeller indicated generally by the numeral 10 is shown provided with a hub 12 and blades 14, the hub being mounted upon the end portion of a propeller shaft 16 journaled in suitable hangers 18 which are mounted upon a supporting surface 20 which may be the bottom of a boat hull or the like. Heretofore, it has been necessary to remove the propeller from the propeller shaft when it is desired to test or gauge the propeller and for obtaining accurate measurements of the pitch and the dimensions of the same.

The present invention has for its fundamental purpose the provision of a gauge device which may be operatively applied to a propeller shaft for gauging and testing a propeller without the necessity for moving the same from the propeller shaft, thereby greatly simplifying and reducing the effort and time required for accurately measuring and testing marine propellers.

The gauging device in accordance with this invention, as will be seen by particular reference to Figure 4, includes a sleeve 22 constituting an inner ring, and which is internally threaded at 24 for threaded engagement upon the externally threaded extremity 26 of the propeller shaft 16 after the usual propeller lock nut, not shown, has been removed from the end of the shaft. At its inner end, the inner ring 22 is provided with an annular head or flange 28 provided with radial bores 30 for the reception of a spanner wrench by means of which the inner ring may be threaded upon the propeller shaft with the flanged or headed extremity 28 in abutment with the hub portion 12 of the propeller. A pair of complementary rings consisting of a riding ring 32 and a jamb ring 34 are slidably and rotatably received upon the cylindrical external surface of the inner ring 22, the adjacent edges of these rings having stepped or shouldered engaging surfaces 36 and at their non-engaging ends having outwardly radially extending circumferential flanges 38 and 40. The end exterior surface of the flange 38 is adapted to abut against the headed member 28, and to be secured thereto as by fasteners, one of which is shown in dotted lines at 42 in Figure 4, whereby the riding ring will be fixedly but removably secured upon the inner ring and in a fixed position with respect to the head 28 and consequently the propeller hub 12. A jamb nut 44 is provided having internal screw threads 46 engageable upon an externally threaded end portion 48 of the inner ring 22, this jamb nut serving to force the complementary riding and jamb rings 32 and 34 into abutting engagement with each other, and the flange 38 of the riding ring into abutting engagement with the headed portion 28 of the inner ring. The jamb nut 44 thus serves to retain the complementary riding and jamb rings upon the inner ring, and serves to vary the frictional engagement between the stepped surfaces 36 of the abutting edges of the two complementary rings.

A support ring 50 is rotatably journaled upon the complementary rings 32 and 34 between the flanges 38 and 40 thereof, and is adjustably secured or locked in various predetermined circumferentially adjusted positions to the flange 40 of the jamb ring 34. For this purpose, a locking pin 52 is slidably carried by the flange 40, being provided with finger grip portion 54 and with a headed locking portion 56 which is yieldingly urged by a compression spring 58 which surrounds the pin 52 into a locking recess 60 formed in the side of the support ring 50. Preferably a plurality of such recesses 60 are provided, as shown in dotted lines in Figure 2, and for convenience these recesses may be disposed at intervals of 18° circumferentially of the axis of the support ring 50. By this means, the support ring may be releasably locked in angularly adjusted position circumferentially of the jamb ring 34.

It will thus be apparent that the riding ring 32 is fixedly secured to the inner ring, while the support ring is adjustably secured to the jamb ring, and the jamb ring and riding rings are adjustably frictionally engaged with each other through the jamb nut 44.

Extending integrally and radially from the exterior surface of the support ring 50 is a lug 62 which may be provided with radial reinforcing webs or ribs 64 if desired. To the outer end of the lug there is pivotally secured an elongated blade 66.

Figure 5:
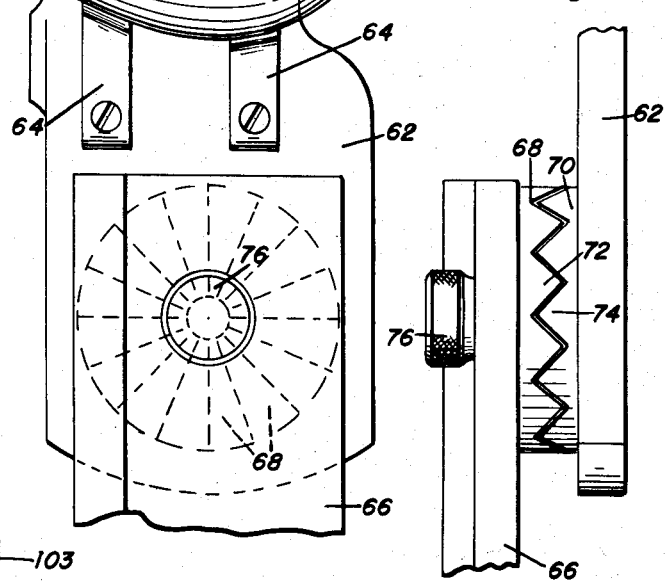
Figure 5 is a fragmentary detail view in elevation upon a large scale of a rotationally adjustable scriber holder forming a part of the gauge.

As shown in Figures 2, 4 and 5, the adjacent surfaces of the blade 66 and the lug 62 are provided with cylindrical bosses 68 and 70, respectively, whose adjacent circular surfaces are formed with complementary radial teeth 72 and 74. A locking screw having a knurled head 76 extends axially through the cylindrical members 68 and 74 clamping the same together with their teeth 72 and 74 engaged, whereby the blade is secured to the lug in pivotally adjusted position thereon, it now being apparent that the blade is movable in a plane extending radially through the lug 62 and the axis of the propeller shaft 16, the lug being offset from the shaft radius for that purpose as shown in Figure 2, and is movable longitudinally of the shaft during its pivoting motion.

Slidably mounted upon the blade 66 for longitudinally adjusted positioning thereon is a block or carriage 78.

As shown more clearly in Figure 3, the blade 66 is provided with a longitudinally extending flange 80 which extends perpendicularly from one edge of the blade, and constitutes a guiding flange. The carriage or block 78 is provided with a complementary channel 82 for slidably receiving the blade 66 and the guide flange 80 thereof, and a fastening screw 84 is provided upon the carriage for engaging the blade to thus lock the carriage upon the blade in longitudinally and slidably adjusted positions.

A cover plate 81 for the channel 82 is removably secured to the carriage 78 by the cap screws 83 and carries the screw 84.

Referring now more particularly to Figures 1–3, it will be further apparent that there is provided a member 86 in the form of a holder which is mounted upon the carriage 78 and is rotationally adjustable thereon.

For this latter purpose, the carriage 78 and holder 86 are provided with complementary circular surfaces having cooperating teeth 88 and 90, respectively, these surfaces and teeth functioning in the same manner as the two cylindrical members 68 and 70 previously mentioned.

Figure 6:
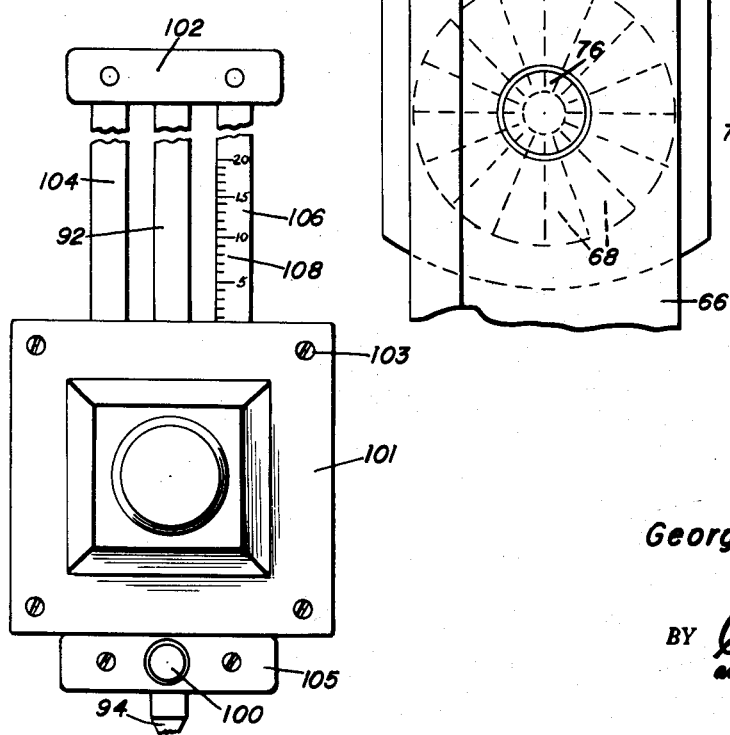
Figure 6 is a fragmentary view, parts being broken away, of the scriber holder and certain associated parts of the invention.

Carried by the holder 86 is a scriber and gauging assembly, which as shown best in Figures 1 and 6, consists of a central scriber bar 92 having a pointed extremity 94 comprising a scriber, this bar being slidably received in guide bores 96 and 98 in the holder 86. A finger screw 100 is provided for fastening the bar 92 in longitudinally adjusted positions in the holder, the finger screw extending through a cover plate 101, removably secured to the holder 86 by the cap screws 103.

At its other extremity, the scriber 92 extends through a slot or bore in the mid-portion of a strap 102, to which are also secured the ends of a guide bar 104 and a gauge bar 106, in parallel relation to the scriber bar 92. Suitable indicia 108 are provided upon the scale or gauge bar 106, this scale and its indicia being appropriately calibrated in accordance with conventional practice for gauging the pitch of propeller blades. Each of the bars 104 and 106 is likewise slidingly received in bores or channels of the holder 86.

An adjustable stop member 105 in the form of a bar similar to the bar 102 is provided with suitable bores receiving the scriber bar 92, and its guide bar and gauge bar 104 and 106. A set screw 107 disposed in the bar 105 serves to lock the same to the scriber bar, and suitable fastening means are provided in both of the bars 102 and 105 for securing the extremities of the bars 104 and 106 thereto.

The holder 86 is rotationally adjustably secured to the carriage 78 by the following means. An Allen screw 109 is received in an axial bore extending through the carriage 78 and opening from the bottom of the channel 82, the threaded extremity 110 of this cap screw being engaged in a suitable threaded bore in the holder 86. By this means, after the complementary clutch teeth 88 and 90 have been engaged, so that the holder 86 is in the desired rotationally adjusted position with respect to the carriage 78, the Allen screw 109 is tightened thereby locking these parts in the desired adjusted position. The blade 66 is then inserted in the channel 82, the cover 81 is then applied and the cap screws 83 tightened.

The embodiment of the invention described herein above is satisfactory where the thread 24 of the sleeve 22 corresponds to the threaded extremity 26 of the propeller shaft 16. However, where the thread 26 is not of a conventional or standard pitch, a modified construction of gauge, disclosed in Figures 7 and 9 may be found to be preferable.

Figure 7:
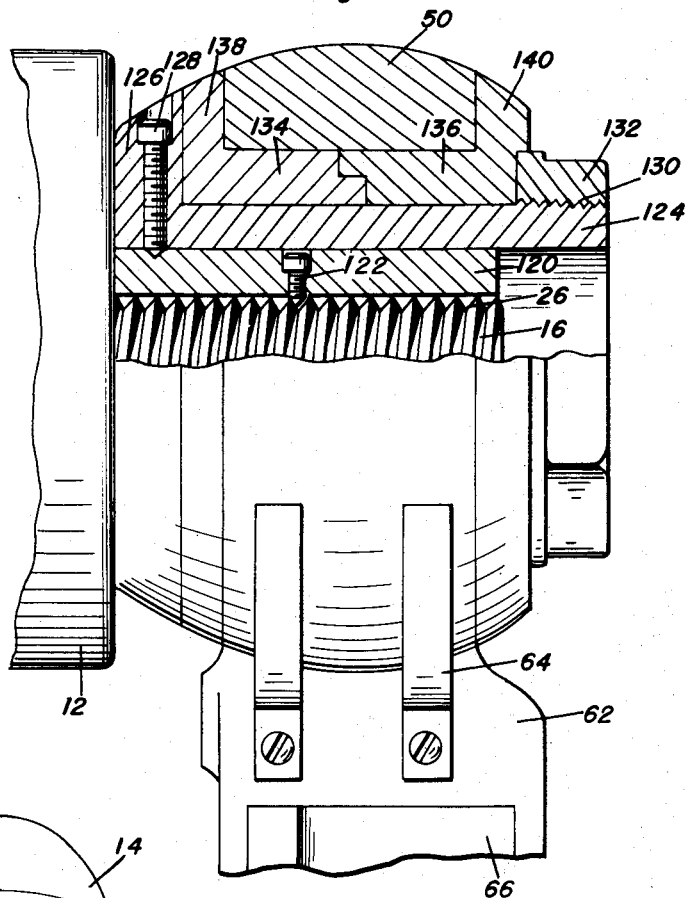
Figure 7 is a view, similar to Figure 4, of a modified structure and arrangement of elements rendering the mounting of the gauge independent of the pitch of the propeller shaft thread.

As disclosed in Figure 7, the gauge is mounted upon the propeller shaft 16, upon the screw-threaded extremity 26 of the same in a different manner from that previously described. There is employed a sleeve 120 which is loosely and slidably received upon the screw-threaded extremity 26, and is adapted to be locked thereon by means of a set screw 122 which may be of the Allen type. This Allen screw 122 is recessed into the exterior cylindrical surface of the sleeve 120.

A sleeve 124 is slidably received upon the sleeve 120, and at one end is provided with a radially extending circular flange 126 which is adapted to abut against the hub 12 of the propeller, suitable set screws or Allen screws 128 being employed to lock the sleeve 124 in position upon the sleeve 120. At its outer end, the sleeve 124 is externally threaded as at 130 for the reception of a jamb nut 132. A pair of complementary rings 134 and 136, having annular retaining flanges 138 and 140 at their opposite extremities, are rotatably received upon the sleeve 124 and are clamped thereon by engagement of the flanges 138 and 140 with the members 126 and 132, respectively. As in the preceding embodiment, the adjacent ends of these rings are provided with stepped shoulders similar to the shoulders 36 and for the same purpose.

Figure 9:
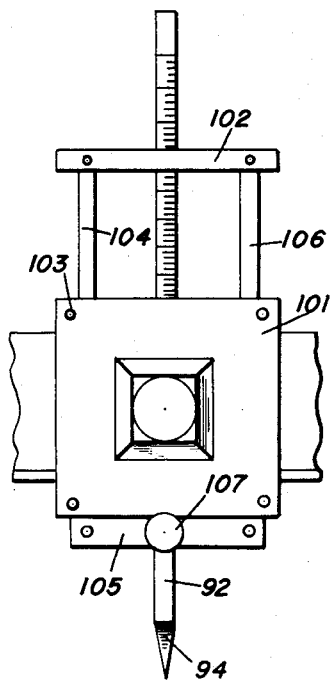
Figure 9 is an elevational view of the scriber and its holder, certain associated parts being broken away.

The rings between their flanges 138 and 140 thus provide an annular or circumferentially extending groove or channel in which is rotatably received the support ring 50 previously mentioned and having the structure associated therewith as previously set forth. The rest of the structure of the gauge of the embodiment of Figure 9 is identical with that previously set forth, and the description as set forth hereinbefore and its operation will suffice and will apply to the embodiment of Figure 7.

Figure 8:
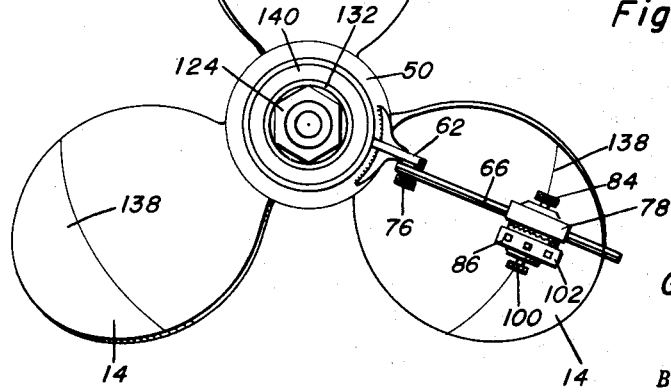
Figure 8 is an end elevational view illustrating the gauge in position for gauging a propeller.

In operating either embodiment of the invention, the usual propeller nut is removed from the end of the propeller shaft and the gauge embodiment of Figures 1–6 or of Figure 7 is then secured upon the propeller shaft and against the propeller hub. After the support assembly has been secured to the propeller shaft, with the holder 86 locked to the carriage 78 in the desired relation, the carriage is slid along the bar 66 to approximately one-third of the length of the blade 14 inwardly from its tip. The carriage is then locked on the bar 66 by the pin 84 a "diameter line" 138 is then inscribed across the blade as shown in Figure 8, and the exact center of the blade upon this line is then determined in a conventional manner and the gauge is then positioned with the scriber upon this center, the gauge being then locked in position by either the jamb nut 44 of Figure 4 or the jamb nut 132 of Figure 7. At this time, the locking pin 52 will be in the central one of the recesses 60. The support ring 50 is then moved 18° by releasing the locking pin 52 and moving the same into the next adjacent recess 60, thus positioning the scriber at the top edge of the blade 14 along the diameter line 138. The scriber is then adjusted until the scriber point 94 contacts the surface or face of the blade whereupon it is locked by the locking pin 100, and the support ring is then moved 36° to the recess 60, the latch pin 54 is again engaged, and the scriber is lowered until the point engages the surface of the blade at the lower edge of the same. The amount dropped from the beginning of the 36° movement when the scriber engages the top edge of the blade at one end of the diameter line 138, until it engages the other edge of the blade at the other end of the diameter line 138, is measured in tenths of an inch upon the scale of the gauge and is the pitch of the blade at that point. This procedure is repeated for several radially spaced positions upon the blade, whereupon the characteristics of the blade as to pitch and contour can be accurately ascertained.

The primary advantage of this device is that these measurements may be taken without the necessity for moving the propeller from the propeller shaft.

From the foregoing, the construction and operation of the device will be readily understood and further explanation is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A gauge for testing marine propellers while mounted on their propeller shafts which comprises an inner ring internally threaded for engagement upon the end of a propeller shaft, a support ring, means securing and rotatably journaling said support ring upon said inner ring, a lug extending radially from said support ring, a pivot carried by said lug, a blade supported by said pivot, a carriage slidable upon said blade, means retaining said carriage in adjusted positions upon said blade, a holder secured to said carriage for rotationally adjusted position thereon about an axis parallel to said pivot, a scriber secured to said holder for sliding movement diametrically of the arcs of rotation of said holder.

2. The combination of claim 1 wherein said blade has a longitudinally extending, laterally projecting perpendicular flange, said carriage having a channel receiving said blade and flange.

3. A gauge for testing marine propellers while mounted on their propeller shafts which comprises an inner ring internally threaded for engagement upon the end of a propeller shaft, a support ring, means securing and rotatably journaling said support ring upon said inner ring, a lug extending radially from said support ring, a pivot carried by said lug, a blade supported by said pivot, a carriage slidable upon said blade, means retaining said carriage in adjusted positions upon said blade, a holder secured to said carriage for rotationally adjusted positions thereon about an axis parallel to said pivot, a scriber secured to said holder for sliding movement diametrically of the arcs of rotation of said holder, and said journaling means comprising complementary riding and jamb rings disposed in coaxial alignment upon said inner ring.

4. The combination of claim 3 and a jamb nut threaded upon said inner ring for forcing said complementary rings into abutment with each other.

5. The combination of claim 3 wherein said journaling means comprises complementary riding and jamb rings disposed in coaxial alignment upon said inner ring, and said riding and jamb rings having radially outwardly extending circumferential flanges on their now adjacent ends retaining said support ring therebetween.

6. The combination of claim 3 wherein said journaling means comprises complementary riding and jamb rings disposed in coaxial alignment upon said inner ring, said riding ring being fixedly secured to said inner ring, and said support ring being fixedly secured in rotationally adjusted position on said jamb ring.

7. The combination of claim 1 wherein said blade is pivoted to said lug for pivoting movement longitudinally of the propeller shaft.

8. The combination of claim 1 wherein said carriage and said holder have complementary toothed circular surfaces.

9. The combination of claim 1 wherein said carriage and said holder have complementary toothed circular surfaces disposed in a plane which is perpendicular to the radial plane in which said blade and support ring rotate.

References Cited in the file of this patent

UNITED STATES PATENTS

| | | |
|---|---|---|
| 1,021,797 | Rice | Apr. 2, 1912 |
| 1,547,380 | Godfrey | July 28, 1925 |
| 1,736,247 | Bodeulos | Nov. 19, 1929 |
| 2,096,752 | Metcalfe | Oct. 26, 1937 |
| 2,132,407 | Fowler | Oct. 11, 1938 |
| 2,265,373 | Johnson | Dec. 9, 1941 |

FOREIGN PATENTS

| | | |
|---|---|---|
| 962,987 | France | June 26, 1950 |